United States Patent [19]

Brosnan et al.

[11] 4,360,925
[45] Nov. 23, 1982

[54] LASER EMPLOYING AN UNSTABLE RESONATOR HAVING AN OUTPUT TRANSMISSIVE MIRROR

[75] Inventors: Stephen J. Brosnan; Richard L. Herbst, both of Menlo Park, Calif.

[73] Assignee: Quanta Ray, Inc., Mountain View, Calif.

[21] Appl. No.: 124,586

[22] Filed: Feb. 25, 1980

[51] Int. Cl.³ .............................................. H01S 3/081
[52] U.S. Cl. ...................................... 372/95; 372/108
[58] Field of Search ...................... 331/94.5 C, 94.5 D

[56] References Cited

U.S. PATENT DOCUMENTS 4,096,447  6/1978  Fluhr .............................. 331/94.5 C
4,156,209  5/1979  Herbst et al. ................... 331/94.5 C

*Primary Examiner*—William L. Sikes
*Attorney, Agent, or Firm*—Harry E. Aine

[57] ABSTRACT

In a high power laser, such as one employing a relatively high gain lasing medium such as $CO_2$ or Nd:YAG, the optical resonator for the laser comprises a positive branch unstable resonator. The output beam is coupled from the unstable resonator by means of a partially transmissive mirror of the resonator, whereby a filled-in beam is obtained while facilitating optical alignment of the output coupling means. In a preferred embodiment, the optical resonator comprises a pair of mirrors collinearly arranged on the optical axis of the resonator to supply an output beam which is collinear with the optical axis of the resonator. The filled-in output beam is of generally uniform power density across the transverse cross sectional dimensions thereof, whereby a near diffraction limited output beam is obtained with more uniform power density.

13 Claims, 11 Drawing Figures

U.S. Patent  Nov. 23, 1982  Sheet 1 of 2  4,360,925
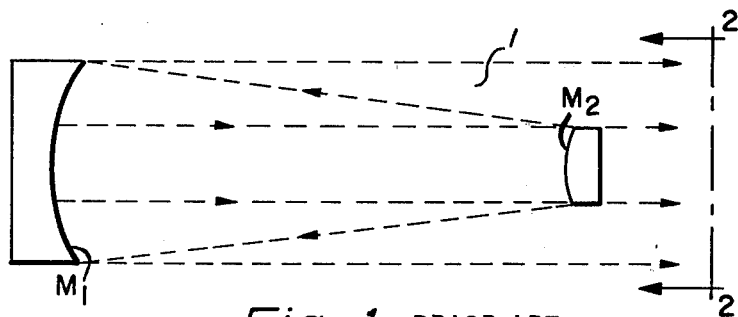
Fig_1 PRIOR ART
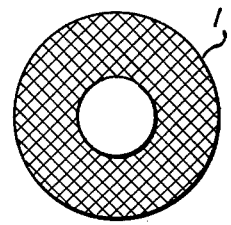
Fig_2 PRIOR ART
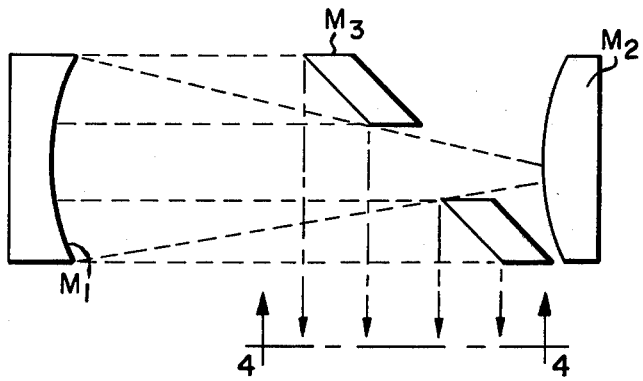
Fig_3 PRIOR ART
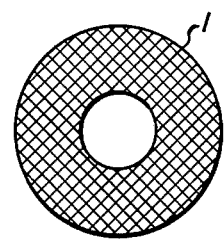
Fig_4 PRIOR ART
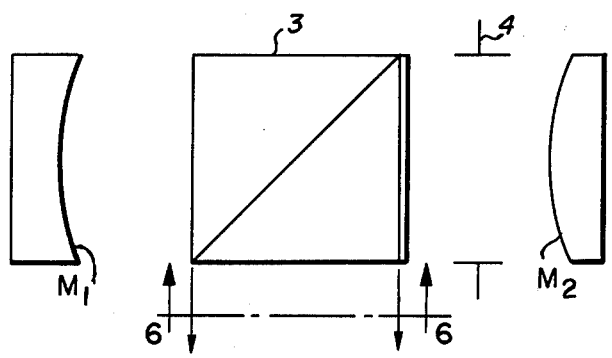
Fig_5 PRIOR ART
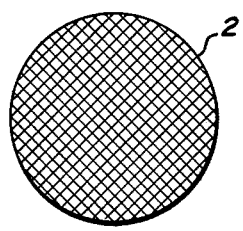
Fig_6 PRIOR ART

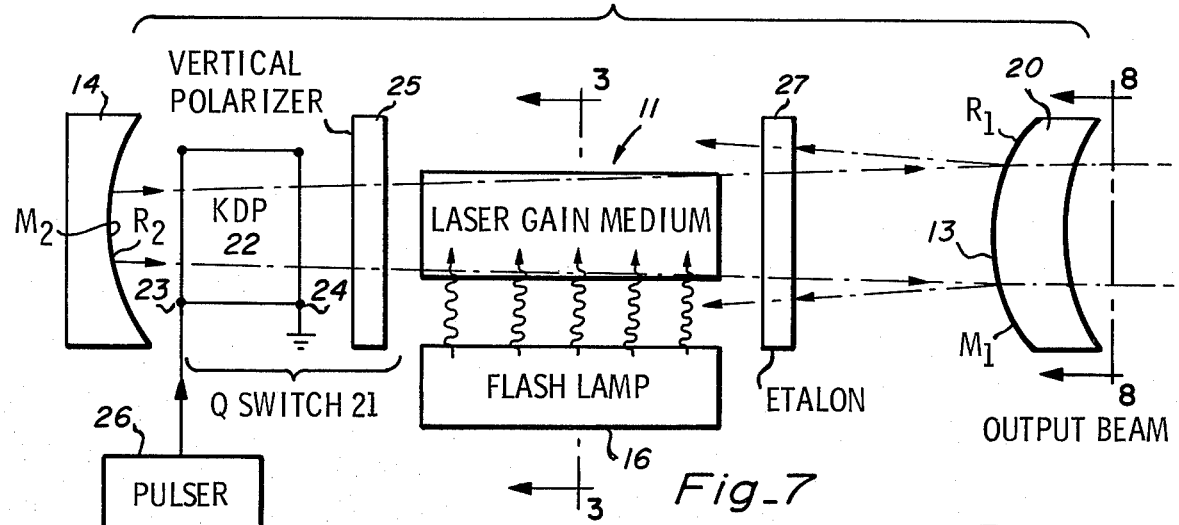
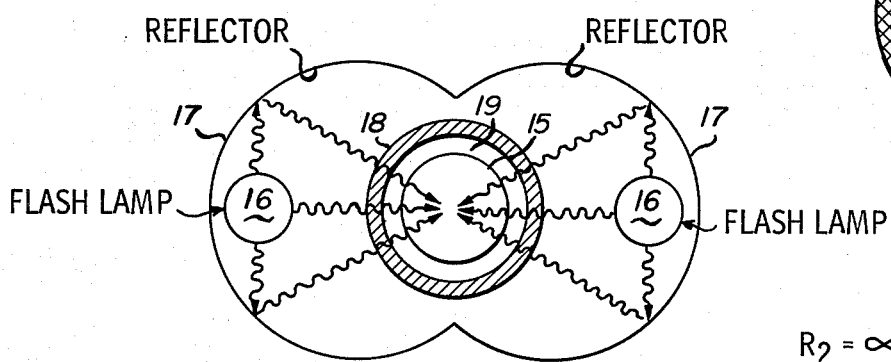
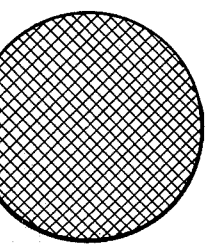
*Fig_8*
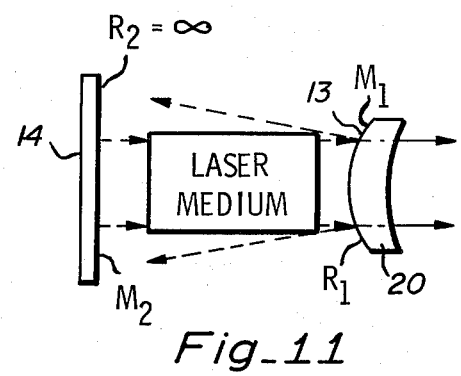
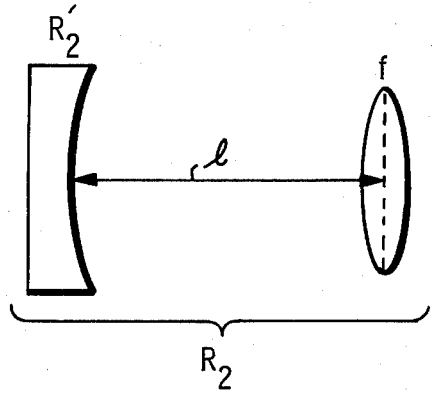

LASER EMPLOYING AN UNSTABLE RESONATOR HAVING AN OUTPUT TRANSMISSIVE MIRROR

BACKGROUND OF THE INVENTION

The present invention relates in general to high power lasers and more particularly to an improved high power laser employing a positive branch unstable resonator.

DESCRIPTION OF THE PRIOR ART

Heretofore, high power lasers have been built to utilize a positive branch unstable optical resonator and a high gain laser medium, i.e., a Nd:YAG rod pumped by means of a flash lamp. At least three prior art output coupling schemes have been employed for extracting the output beam from the optical resonator of the laser.

In one prior art output coupling scheme, the output beam was diffracted around the outer periphery of one of the mirrors of the optical resonator. In a typical example, the output mirror was circular and provided an annular output beam wherein the power density was generally uniformly distributed about an annulus of the beam, resulting in the typical airy disc beam pattern in the far field. Such an output coupler is described in an article appearing in Applied Optics, Volume 13, No. 2, pages 353-357, published February 1974, see page 354. The problem with this type of a prior output coupler is that the center of the beam is relatively devoid of power and when the beam is utilized in other nonlinear optical devices, such as for pumping a parametric oscillator, the hollow center of the beam results in a loss of performance. It was also proposed in this article to radially taper the reflectivity of the output mirror according to a Gaussian distribution to avoid edge effects, see page 360.

It has also been proposed in the prior art, for such positive branch unstable resonators, to couple the output beam from the optical resonator via the intermediary of an annular mirror coaxially disposed of the optical axis of the resonator and inclined at an angle thereto for shaving the beam and for reflecting the shaved annular portion of the beam out of the optical resonator generally in a direction orthogonal to the optical axis thereof. Such a prior art scheme is taught in the aforecited Applied Optics article at page 356. An additional problem with this type of a prior art coupler is that the annular mirror introduces an additional optical element inside the resonator which complicates optical alignment of the resonator.

In another prior art output coupling scheme for coupling the output beam from a positive branch unstable resonator, a polarizing prism is interposed within the optical resonator. The polarizing prism serves to reflect energy of a certain polarization within the cavity at an angle to the optical axis. This type of an output coupler produces an output beam which has generally uniform transverse cross sectional power density except for some fringing caused by Fresnel diffraction. A problem with such a polarization output couplers is that additional cavity optical elements are required which are sensitive to misalignment and results in consequent unreliability.

SUMMARY OF THE PRESENT INVENTION

The principal object of the present invention is the provision of an improved laser employing a positive branch unstable resonator with means for coupling the output beam from the resonator in such a manner that the beam has a generally uniform transverse cross sectional power density.

In one feature of the present invention, the positive branch unstable resonator of the laser includes an optical reflector which is partially transmissive for coupling an output beam from the resonator which is generally of uniform transverse cross sectional power density.

In another feature of the present invention, the output optical reflector is collinear with the optical axis of the resonator, whereby the output beam is collinear with the optical axis of the resonator.

In another feature of the present invention, the output mirror is deposited upon a face of a meniscus lens.

In another feature of the present invention, the output mirror has a generally uniform transmissivity falling within the range of 50-90%.

In another feature of the present invention, the optical resonator comprises a confocal resonator whereby the output beam is collimated.

Other features and advantages of the present invention will become apparent upon a perusal of the following specification taken in connection with the accompanying drawings wherein:

BRIEF DESCRIPTION OF THE DRAWINGS

FIG. 1 is a schematic line diagram of a positive branch unstable optical resonator depicting a prior art method for extracting the output beam, FIG. 2 is a cross sectional view of the output beam of the structure of FIG. 1, FIG. 3 is a view similar to that of FIG. 1 depicting an alternative output coupling scheme, FIG. 4 is a transverse sectional view of the output beam of the resonator of FIG. 3, FIG. 5 is a view similar to those of FIGS. 1 and 3 depicting another prior art output coupling scheme, FIG. 6 is a transverse sectional view of the output beam derived from the structure of FIG. 5, FIG. 7 is a longitudinal sectional view, partly in block diagram form, of a laser incorporating features of the present invention, FIG. 8 is a transverse sectional view of the output beam of the structure of FIG. 7 taken along line 8—8 in the direction of the arrows, FIG. 9 is a transverse sectional view through the structure of FIG. 7 taken along line 3—3 in the direction of the arrows, FIG. 10 is a schematic line diagram depicting the focal properties of the laser gain medium in the structure of FIG. 7, and FIG. 11 is a schematic line diagram similar to that of FIG. 7 depicting an alternative embodiment of the present invention.

DESCRIPTION OF THE PREFERRED EMBODIMENT

Referring now to FIGS. 1 and 2 there is shown a prior art positive branch unstable optical resonator wherein the output beam 1 is diffracted out around the outer periphery of one of the mirrors $M_2$ of the optical resonator formed by the space between a pair of collinear mirrors $M_1$ and $M_2$. This type of optical resonator, when used in a laser produces an annular output beam as shown in FIG. 2. A problem with this type of beam, is that it is non uniform in transverse cross sectional power density, i.e., provides reduced intensity on the beam axis at the focus of a lens. This occurs even though the beam is nearly diffraction limited. In addition, beams of non uniform transverse cross sectional power density provide somewhat reduced performance in some nonlinear optical devices, such as parametric oscillators pumped with such a beam. This type of resonator and output coupling scheme is fully described in the aforecited Applied Optics article.

Referring now to FIGS. 3 and 4 there is shown an alternative prior art positive branch unstable resonator similar to that of FIG. 1 except that the output beam is extracted from the resonator via the intermediary of a beam scraping mirror $M_3$ disposed coaxially with the axis of the optical resonator and having a central opening through which the beam passes to and fro between the optical reflectors $M_1$ and $M_2$ until such time as the beam expands in diameter sufficiently to be intercepted by the mirror $M_3$ whence the annular beam is reflected from the cavity along a direction generally orthogonal to the optical axis of the resonator. Again the output beam 1 is of annular configuration and has the same difficulties and problems as the beam of FIG. 2. However, an additional difficulty with the output coupling scheme of FIG. 3 is that an additional optical element, namely, the mirror $M_3$ is interposed in the resonator, thereby causing potential misalignment problems. This prior art optical resonator and output coupling scheme is disclosed in the aforecited Applied Optics article.

Referring now to FIGS. 5 and 6 there is shown an alternative prior art positive branch unstable optical resonator of a type wherein the output beam 2 is of generally uniform transverse cross sectional power density, thereby obviating some of the difficulties associated with use of an annular beam. However, the output coupling scheme of FIG. 5 utilizes a polarization extraction scheme wherein a prism polarizer 3 and beam aperture stop 4 are disposed on the optical axis of the resonator. The prism 3 serves to extract optical radiation within the resonator of a predetermined polarization to form the output beam which is directed generally orthogonally to the optical axis of the resonator. A laser incorporating such an optical cavity and output coupling scheme is marketed commercially by Molectron Corporation of Sunnyvale, Calif. The problem with this type of an optical resonator and output coupling scheme is that additional optical elements are interposed in the resonator, thereby introducing potential misalignment problems to adversely affect reliability and performance.

Referring now to FIGS. 7 and 9 there is shown a laser incorporating features of the present invention. The laser includes an optical resonator 12 defined by the region between an output mirror 13 and another end mirror 14. The spacing L on the optical axis between the first and second mirrors 13 and 14 must be adjusted to take into account the optical characteristics of all of the optical elements disposed within the optical resonator 12.

A laser gain medium 15, such as a neodymiun doped yttrium-aluminum garnet (Nd:YAG) or $CO_2$ is disposed on the optical axis of the resonator 12 for providing optical gain for the laser. A flash lamp 16, such as a pair of xenon flash lamps, disposed within a pair of elliptical reflectors 17, serve to irradiate the laser gain medium 15 with optical energy for pumping the laser gain medium 15 to a population inversion of the lasing transitions. A hollow cylindrical ultraviolet filter 18 is disposed coaxially surrounding the laser gain medium 15 in spaced relation therefrom to filter out the UV radiation and to provide an annular passageway 19 for flow of a fluid coolant therethrough for cooling of the laser gain medium is use. A Q switch 21 is disposed within the optical resonator 12 on the optical axis thereof. The Q switch serves as a fast acting switch for pulsing the laser on and off. In a preferred embodiment the Q switch 21 comprises a KD*P crystal 22 having a pair of ring electrodes 23 and 24 disposed on opposite ends thereof for applying an electrical potential thereacross so that when the potential, as of several kV, is applied across the KD*P crystal 22, the crystal serves to rotate the polarization of the optical radiation by approximately one-quarter of a wavelength for each transit through the KD*P crystal. A linear polarizer 25 is associated with the KD*P crystal for polarizing the optical radiation in a first linear direction, such as in the vertical direction. The electrical potential is applied across the KD*P crystal from a pulser 26, such as thyratron. A tilted etalon 27 is disposed on the optical axis of the resonator for providing a band pass filter at the desired operating optical wavelength of the resonator. The output mirror 13 is deposited upon the convex face of a meniscus lens 20 made of a good optical quality material such as fused silica and commercially available from Lambda Optics, Inc. of Berkeley Heights, N.J.

The optical resonator 12 is designed as a positive branch unstable resonator, i.e., a ray slightly off the optical axis of the resonator 12 traces a reflective path back and forth between the mirrors 13 and 14 which begins off the optical axis of the resonator and moves toward the axis to the diffraction limit and then moves radially toward the outside of the beam, thereby producing a net power flow in the resonator which moves radially outward from the optical axis of the resonator. The output mirror 13 is made partially transmissive, i.e. 50-90%. transmissive and preferably 70-80% transmissive so that the output beam is taken out of the optical resonator through the output mirror 13 and meniscus lens 20. This has the advantage that the output beam is filled-in, i.e., has a generally uniform transverse cross sectional power density as shown in FIG. 8. Also, the output beam is collinear with the optical axis of the optical resonator 12, thereby improving the laser form factor, as contrasted with the prior art scheme of FIGS. 5 and 6. The meniscus lens support for the output mirror 13 is disclosed and claimed in U.S. Pat. No. 4,156,209 issued May 22, 1979 and assigned to the same assignee as the present invention.

In addition, the curvatures of the two mirrors and the focal properties of the various elements within the resonator, especially including the thermal focusing properties of the laser gain medium 15, when Nd:YAG is used, are arranged so that the output beam at the plane of the output mirror 13 is collimated, i.e., the beam is neither diverging or converging in the region of the beam at the output mirror 13. This is accomplished in the preferred embodiment of the present invention, as illustrated in FIG. 7, by designing the optical resonator 12 taking into account the thermal focusing properties of the laser gain medium 15 so that the optical resonator is a confocal resonator 12.

In case the output mirror 13 is convex, the focal point thereof, as used in the definition of confocal, refers to the imaginary focal point and corresponds essentially to the radius of curvature $R_1$ of the output mirror 13 divided by two. The focal region of the optical resonator 12 occurs in the transverse plane of the output mirror 13.

As above mentioned, the laser gain medium 15, such as the Nd:YAG laser rod, has a thermal focusing effect and operates as a positive lens having a focal length f in meters versus average flash lamp input power P in kilowatts which is closely approximated by for Nd:YAG by the equation:

$$f = 3.8/p \qquad \text{(Eq. 1)}$$

In addition the optical resonator 12 is designed so that no focal point is included within the resonator 12 (positive branch resonator, see the aforecited Applied Optics article for a definition of the positive branch unstable resonator). The reason for this is that at a focal point within the resonator, the intensity of the beam might well exceed the dielectric strength of the air or of the material in which the focal point occurred. This would result in deleteriously affecting the peak power capability of the laser and could result in destruction or degradation of one or more of the optical components within the optical resonator 12 of the laser.

Furthermore in a preferred embodiment, the optical resonator 12 is of the confocal type when taking into account the positive lens effect of the laser gain medium 15 due to the thermal gradient within the laser gain medium by the absorbed flash lamp power. The optical resonator 12 preferably has an output coupling coefficient or factor δ which is relatively high, i.e., greater than 50% and preferably in the range of 70-80%.

In a typical example of the laser 11, the laser gain medium 15 comprises a lightly doped Nd:YAG rod as of 6.3 millimeter diameter and doped to a doping of between 0.5% and 1.2% Nd by atomic weight. The rod 15 has a length greater than two inches and approximately two inches of its length is pumped by means of the high energy xenon flash lamps 16 having an average input power of approximately 800 watts. The ends of the laser rod 15 are parallel and inclined at an angle of approximately 5° out of perpendicular relative to the optical axis of the resonator 12 to prevent setting up of undesired multiple reflection internally of the rod. The xenon flash lamps 16 have elliptical reflectors 17 coated with gold or silver. The linear polarizer 25 comprises a calcite crystal which is commercially available from Karl Lambercht, Inc. of New Jersey. The KD*P crystal 22 has a diameter greater than the diameter D of the laser rod 15 and preferably comprises a deuterated potassium dihydrogen phosphate crystal commercially available from Lasermetrics, Inc. of New Jersey. The back resonator reflector 14 can be a grating or a mirror which is planar, concave or convex with a radius of curvature $R_2$ determined by the conditions necessary for a confocal resonator taking into account the positive lens effect of the laser gain medium 15. In one preferred embodiment, the back resonator mirror 14 is planar having a high reflectivity coating formed by a multilayer dielectric coating on a fused silica substrate to provide greater than 99% reflectivity at a wavelength of interest for the operating wavelength of the resonator 12. Suitable mirrors are commercially available from Coherent Radiation, Inc. of Palo Alto, Calif. The diameter of the back resonator mirror 14 is preferably much greater than the diameter of the laser rod 15 and, in a typical example, is approximately 1.0 inch in diameter.

The line narrowing element, such as the tilted etalon 27 is designed for a narrow passband width between 0.1 and 0.5 wave numbers. In a preferred embodiment it has a band pass center wavelength of 1.064 micrometers. A suitable tilted etalon is commercially available from Coherent Radiation, Inc. of Palo Alto, Calif. The laser 11 preferably has a resonator magnification M falling within the range of 1.1 to 2 where the magnification M is always positive and is defined as the ratio of $R_2/R_1$. In a preferred embodiment, the magnification M was 1.4.

The mirror radii of curvature for the positive branch unstable confocal optical resonator 12 are defined by:

$$R_1 = 2L/(M-1) \qquad \text{(Eq. 2)}$$

$$R_2 = 2ML/(M-1) = MR_1 \qquad \text{(Eq. 3)}$$

where L is the empty resonator length, $R_1$ and $R_2$ are the output and back resonator mirror curvatures and M is the magnification.

The geometrical output coupling coefficient δ is no longer dependent on the magnification M and can be chosen independently to maximize the output energy.

To reduce optical resonator losses, M is chosen as small as possible yet greater than 1. To keep cavity alignment stability, M is chosen as large as possible, i.e., 1.4. L is determined by the physical space available such as 60 centimeters. Longer values of L introduce optical alignment instabilities and shorter values of L produce short output pulse lengths and difficulties in accommodating the internal optical resonator optics.

Next determine the output mirror radius of curvature $R_1$ from Equation (2). Using the values of L and M chosen above, the output mirror radius of curvature $R_1$ is approximately 3 meters.

Next determine the necessary effective back mirror curvature $R_2$ from Equation (3). Using the value $R_1$ chosen above, $R_2 = 4.2$ meters.

Now add in the laser rod focusing effect using the relation:

$$1/R_2' \approx (1/R_2) - (1/f) \qquad \text{(Eq. 4)}$$

f is determined from Equation (1) and this yields a value for $R_2'$, (corrected radius of curvature for the back mirror) of approximately 363 meters.

Pick a value for $R_2'$ which is close to the calculated value and preferably a standard value, if possible, such as flat.

As an example, with $R_1 = -300$ centimeters (convex) radius and we choose $L = 60$ centimeters then $R_2 = 420$ centimeters (concave) for $M = 1.4$. Operating at an average input lamp power of 800 watts (80 Joules at 10 pulses per second) gives a rod focal length f near 475 centimeters which leads to a standard flat back mirror curvature $R_2'$.

The output beam pattern is as shown in FIG. 8 and comprises a filled-in beam with a small amount of amplitude modulation which is manifested by diffraction rings in the near field. In the far field, the beam remains filled-in with a preponderance of the energy in the central lobe.

The flash lamp 16 is typically operated with a pulse length of approximately 200 microseconds to deliver between 20 and 80 Joules of energy to the laser rod 15 with a pulse repetition rate of approximately 10 Hertz. The laser is Q-switched on after each of the flash lamp pump pulses to dump the energy stored in the laser gain medium into the output laser beam. The aforementioned laser has operated at up to 250 mJ energy per output beam pulse with a pulse width of approximately 10 nanoseconds. This corresponds to a peak power outside the optical resonator 12 of 25 megawatts and to 100 megawatts per square centimeter. The circulating power density inside the resonator is approximately 100 megawatts per square centimeter.

The advantages to the laser employing the positive branch unstable resonator with a partially transmissive output coupling mirror of the present invention, as contrasted with the prior art lasers, is that an unstable resonator is provided which has essentially unlimited mode volume for increased output energy and also provides a more uniform near diffraction limited beam. This means that the laser beam is more nearly characterized as having a plane wave front which diffracts with nearly diffraction limited characteristics thereby producing a more uniform beam. In addition, the optical elements of the resonator are less complex and easier to retain in alignment than the prior art polarization output coupler scheme of FIGS. 5 and 6 wherein depolarization effects, such as those produced by the Nd:YAG rod, result in producing a non uniform output beam.

Also the design of the laser of the present invention is simplified due to the lack of dependence of the laser gain medium diameter D, and output coupling coefficient $\delta$ on magnification M.

In addition, the partially transmissive output coupling mirror of the present invention is useful not only in unstable resonators of the type employing only a pair of mirrors with the mirrors being coaxially aligned on the optical axis of the resonator, but may also be employed in ring resonators as described in the aforecited Applied Optics article. Also, the gain medium need not be a Nd:YAG rod but may comprise other lasing gain material such as $CO_2$ and other materials of lesser gain.

What is claimed is:

1. In a laser:
   optical resonator means for excitation with electromagnetic energy for resonance at a resonant optical wavelength and having at least first and second optical reflector means disposed along an optical axis of said resonator means for reflecting resonant optical energy generally along the optical axis to another one of said reflector means;
   laser gain medium means for disposition within said optical resonator means for providing gain to the electromagnetic energy within said optical resonator means at said resonant optical wavelength; and
   said optical resonator means comprising a positive branch unstable resonator and wherein said first optical reflector means disposed on said optical axis of said optical resonator means has a first reflective surface for reflecting resonant optical energy to said second optical reflector means, said first reflector surface being partially transmissive for coupling an output beam of coherent resonant optical energy from said optical resonator means through said first partially transmissive surface of said first reflector means as a filled-in beam of generally uniform transverse cross sectional power density.

2. The apparatus of claim 1 wherein said first optical reflector means has a transmissivity falling within the range of 50–90%.

3. The apparatus of claim 1 including meniscus lens means having said first optical reflector means deposited upon a face thereof which faces into said optical resonator means so that the output beam is coupled through said meniscus lens.

4. The apparatus of claim 1 wherein said first and second optical reflector means are collinear.

5. The apparatus of claim 1 wherein said optical resonator means including the focusing effect of said laser gain medium is formed and arranged as a confocal optical resonator at said resonant optical wavelength.

6. The apparatus of claim 1 including pump lamp means for irradiating said gain medium means with pumping optical energy for exciting said laser gain medium, and wherein the focal length f of the laser gain medium is inversely proportioned to the average lamp input power.

7. The apparatus of claim 6 wherein the laser gain medium is a yttrium aluminum garnet crystal doped with neodymium to less than one atomic weight percent.

8. The apparatus of claim 1 wherein said first reflector means is a convex mirror disposed facing and coaxial with said second reflector means which comprises a planar mirror.

9. The apparatus of claim 1 including switch means within said resonator means and in the optical path of said optical resonator means for switching said optical resonator means between a resonant and a nonresonant state for optical electromagnetic wave energy of said resonant optical wavelength for switching the laser beam on and off.

10. The apparatus of claim 9 wherein said switch means includes linear polarizer means for linearly polarizing optical wave energy passing therethrough and quarter wave plate means for rotating the polarization of the optical wave energy by approximately 90° per pass therethrough in response to an input.

11. In a laser;
    an unstable positive branch optical resonator:
    a laser gain medium disposed within said optical resonator;
    said resonator having a partially transmissive mirror means for extracting a filled-in output laser beam from said resonator,
    said mirror means having a first reflective surface for reflecting resonant optical energy to said optical resonator, and
    said first reflective surface being partially transmissive for extracting said filled-in output laser beam from said resonator through said first partially transmissive surface of said mirror means.

12. The apparatus of claim 11 including a Q switch disposed within said optical resonator for switching on and off the output laser beam.

13. The apparatus of claim 11 including an etalon disposed within said optical resonator for selecting the operating wavelength of the laser.

* * * * *